United States Patent [19]
Wanninkhof et al.

[11] 4,101,260
[45] Jul. 18, 1978

[54] FLASH ARRAY

[75] Inventors: Markus Wilhelm Matthijs Wanninkhof; Johnny Wilhelmus van der Velden; Pieter Hendrik Broerse, all of Eindhoven, Netherlands

[73] Assignee: U.S. Philips Corporation, New York, N.Y.

[21] Appl. No.: 722,721

[22] Filed: Sep. 13, 1976

[30] Foreign Application Priority Data

Sep. 15, 1975 [NL] Netherlands ............... 7510808

[51] Int. Cl.² .............................................. F21K 5/02
[52] U.S. Cl. .................................... 431/95 R; 362/10; 362/15
[58] Field of Search ............... 431/93, 94, 95, 95 A; 240/1.3; 362/10–15

[56] References Cited

U.S. PATENT DOCUMENTS

| 3,060,710 | 10/1962 | Bennett | 431/94 |
| 3,666,394 | 5/1972 | Bok et al. | 431/95 |
| 3,873,261 | 3/1975 | Cote | 431/95 |
| 3,941,992 | 3/1976 | Blount et al. | 240/1.3 |

Primary Examiner—Carroll B. Dority, Jr.
Attorney, Agent, or Firm—Frank R. Trifari; Robert S. Smith

[57] ABSTRACT

A flash array which is provided with a transparent electrically conductive layer which serves to prevent spontaneous ignition of a flash lamp in the device. The flash array is provided with high voltage combustion flash lamps and the transparent electrically conductive layer consisting of conductive indium oxide which is applied to the inner side of a transparent cover of the array. The resistance per square of that layer is smaller than 100 kOhm, so that for these lamps — which are, for example, ignited by means of a piezo element — substantially no spontaneous ignition occurs.

3 Claims, 6 Drawing Figures

FLASH ARRAY

The invention relates to flash array provided with a combustion flash lamp and with an electrical conductor in which for substantially all directions of radiation of the flash array it holds that the light to be radiated passes the conductor and in which this conductor is electrically connected to a terminal of the lamp, and at least part of the electrical conductor is constructed as a transparent electrically conductive layer, A known device of the kind indicated is, for example, described in U.S. Pat. Specification No. 3,060,710. Herein the transparent electrically conductive layer serves to prevent the inadvertent flashing of the lamp owing to a stray field, for example resulting from an electrostatic charge.

A disadvantage of this known device is that when a combustion flash lamp of the high voltage type is used a great risk of spontaneous flashing of the lamp exists. This is caused by the fact that high voltage combustion flash lamps are as a rule very sensitive.

It is an object of the invention to provide a flash array of the kind mentioned in the preamble in which the risk of a spontaneous flashing of a high voltage combustion flash lamp is very small.

A flash array according to the invention provided with a combustion flash lamp and with an electrical conductor in which it holds for substantially all directions of radiation of the flash array that the light to be radiated passes the conductor and in which this conductor is electrically conducted to a terminal of the lamp, and at least part of the electrical conductor is constructed as a transparent electrically conductive layer is characterized in that the lamp is a high voltage combustion flash lamp and in that the transparent electrically conductive layer has a resistance per square which is smaller than 100kOhm.

An advantage of a flash array according to the invention is that the lamp is very well protected from stray fields, more specifically owing to the relatively small resistance per square of the transparent electrically conductive layer. The chance for the spontaneous ignition of the high voltage combustion flash lamp is therefore very small.

A high voltage combustion flash lamp must be understood to mean here a combustion flash lamp which is normally ignited by applying a voltage of at least one kVolt between its terminals.

A transparent electrically conductive layer must be understood to mean here an electrically conductive layer which transmits at least 60% of the incident flash light.

Preferably the transparent electrically conductive layer has a resistance per square which is smaller than 50 kOhm. An advantage thereof is that this offers a still better guarantee that spontaneous flashing will not occur.

The transparent electrically conductive layer consists, for example, of stannous oxide which may, for example, also have been doped.

In a preferred embodiment of a flash array according to the invention the transparent electrically conductive layer consists mainly of conductive indium oxide.

An advantage of this preferred embodiment is that it enables a very good compromise between a low resistance per square of the conductive layer on the one hand a high transmissivity of the flash light on the other hand.

A next preferred embodiment of a flash array according to the invention comprises means to eliminate, prior to igniting the combustion flash lamp, a short-circuit between one terminal of the lamp and another terminal of that lamp.

An advantage if this preferred embodiment is that it can be achieved therewith that until just prior to ignition — or till it is this lamp turn the two terminals, and consequently also the two current supply wires in the lamp, have together with the electrically conductive layer the same potential. This reduces the risk for a spontaneous ignition still further. Thereafter the short-circuit is eliminated so that the lamp can be flashed.

The flash array may, for example, be constructed as a flash lamp unit which is provided with at least two high voltage combustion flash bulbs. The flash array may also consist of a single flash lamp.

For a next preferred embodiment of a flash array according to the invention which is constructed as a flat unit it holds that for substantially all directions of radiation of the flash array the light to be radiated passes the transparent electrically conductive layer, whilst the array has been provided with at least two high voltage combustion flash lamps and that the transparent electrically conductive layer is constructed as a common layer for at least two lamps and that the conductive layer is connected to a terminal of either of the two lamps.

An advantage of this preferred embodiment is that only one conductive layer will do for several lamps.

This common transparent electrically conductive layer may, for example, consist of a coating which is applied by means of a vacuum deposition on a transparent film which covers the lamps. In a further improvement of said last preferred embodiment the transparent electrically conductive layer is applied on a transparent cover of the flash array.

An advantage of this further improvement is that besides acting as a mechanical protection of the contents of the flash array, that cover also ensures that the spontaneous ignition of the flash lamps is prevented.

In this last said improvement the transparent electrically conductive layer may, for example, be applied to the outer side of the cover.

In a further preferred embodiment of a flash array according to the invention the transparent electrically conductive layer is applied to the inside of the cover.

An advantage of this preferred embodiment is that now the electrically conductive layer is protected from any damage.

In a next preferred embodiment of an array according to the invention in which the lamp is arranged in a reflector which comprises at least a layer of an electrically conductive material, this reflecting layer also being electrically connected to the transparent electrically conductive layer.

An advantage of the said last preferred embodiment is that, together with the reflecting layer the electrically conductive layer gives a very good electrical shielding of the flash lamp. The chance for spontaneous ignition of the lamp is then extremely small.

In a further preferred embodiment of a flash array according to the invention in which the array is constructed as a device having one single lamp, the lamp is arranged in a reflector and it holds for substantially all directions of radiation of the device that the light to be radiated passes the transparent electrically conductive layer, the transparent electrically conductive layer being applied to a transparent cover of the device.

An advantage of this device is that also here a good protection against spontaneous ignition is present. This is important for this kind of single lamp devices, as they can absolutely not be used anymore in the case the lamp inadvertently ignites.

In a further preferred embodiment a flash array according to the invention the transparent electrically conductive layer is applied to the wall of the flash lamp.

An advantage of this device is that the lamp itself is already protected from spontaneous ignition; consequently preventive measures in a luminair or for example on the cover of a flash array can be dispensed with.

The transparent electrically conductive layer may, for example, be applied to the outside of the wall of the flash lamp.

In a next improvement of said last preferred embodiment of a flash array according to the invention the transparent electrically conductive layer is applied to the inside of the wall of the flash bulb, the envelope of that lamp being the envelope of the flash array at the same time.

An advantage of this preferred embodiment is that the electrically conductive layer is less liable to damage and that the lamp is also the entire flash array so that as has been observed above no further provisions need be taken in a luminair or such to prevent spontaneous ignition.

In a further preferred embodiment of a flash array according to the invention in which the transparent electrically layer is applied to the inside of the wall of the flash lamp this layer covers the wall of the flash lamp only partially, but at least flush with an ignition paste in the lamp, which ignition paste is provided with a current supply element, the lamp being filled with shredded material which, just as the transparent electrically conductive layer, belongs to the electrical conductor and in which the transparent electrically conductive layer connects the shredded material electrically to the current supply element which is provided with the paste, which current supply element is connected in its turn to a terminal of the lamp.

An advantage of this preferred embodiment is that the transparent electrically conductive layer may be cheaper as it should cover the wall surface of the lamp only partially. The underlying principle is that the shredded material, owing to its electrical throughconnection also serves as electrical shielding of the paste in combination with the transparent electrically conductive layer.

It should furthermore be noted that U.S. Pat. Specification No. 3,873,261 discloses a high voltage combustion flash lamp in which an electrically conductive layer partially covers the inner wall of that lamp. Therein that layer also serves to prevent a spontaneous flashing of the lamp. It has also been indicated that the layer may electrically contact the shredded material in the lamp. It has not been indicated that that layer might be transparent; there is no need for transparency of that layer in the case of a lamp according to the American Patent Specification mentioned above in view of the location of that layer. However, if the layer is opaque the disadvantage occurs that either light of the lamp is intercepted by that layer or the electrical contact of that layer with the shredded material leaves much to be desired for. This disadvantage is not met when a transparent electrically conductive layer according to the present invention is used.

The invention will be further explained with reference to a drawing in which.

Figure 1:
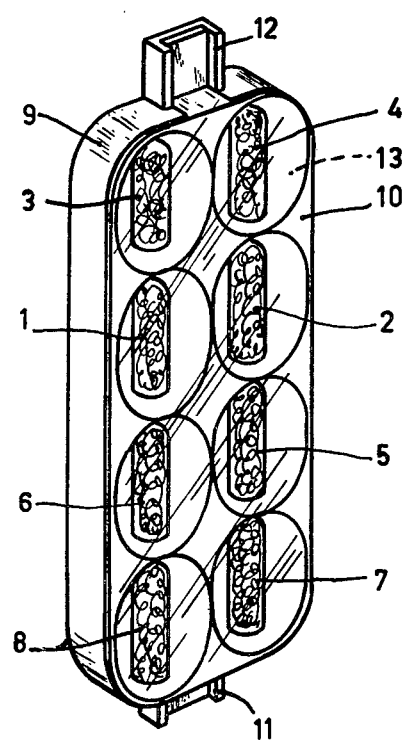
FIG. 1 shows a perspective view of a flash array according to the invention.

In FIG. 1 reference 1 to 8 indicate high voltage combustion flash lamps. Reference 9 indicates an opaque plastic casing. The casing 9 is covered with a transparent plastic shield 10 which is located over the lamps. The inner side of the transparent shield (cover cap) 10 is provided with a transparent electrically conductive layer 13 which consists of conductive indium oxide. The casing and shield forming a housing for the lamp. This layer is approximately 4nm thick and has a resistance per square of approximately 20kOhm. The transmissivity of this layer for electromagnetic waves in the visible range ist at least 95%. The dimensions of the flash array shown in FIG. 1 are approximately 11 × 4 × 1.5 cm.

References 11 and 12 in FIG. 1 indicate substantially equal connecting elements of the flash array. As a rule element 11 is first placed in a suitable opening of a photocamera, not shown here, whereafter the lamps 1, 2, 3 and 4 are flashed. Thereafter the array is reversed so that element 12 can be inserted into said opening of the camera whereafter the lamps 5 to 8 inclusive are flashed. In this way it is obtained that the angle between the axis of the camera lens and that of the lightbeam of the lamp is not too close to zero degrees. The object of this is to avoid the so-called red-eye effect.

Figure 2:
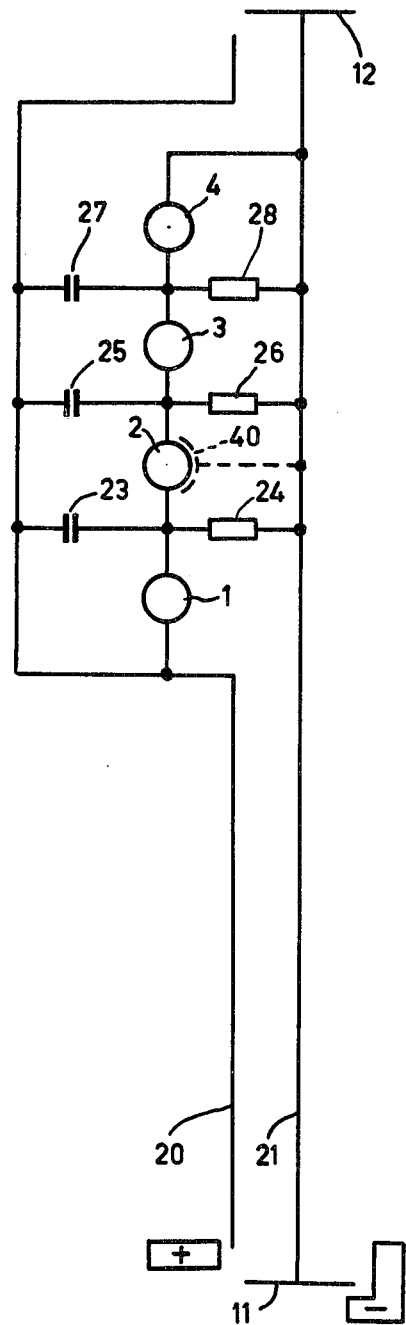
FIG. 2 shows a part of the electrical circuit of the flash array of FIG. 1.
Figure 4:
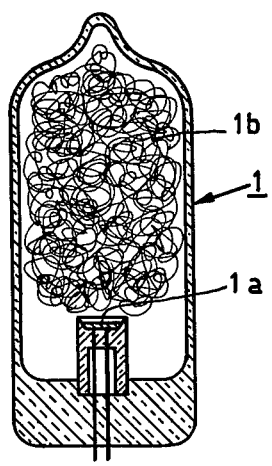
FIG. 4 shows a longitudinal section through a high voltage combustion flash lamp of the array of FIG. 1.

In FIG. 2 which shows half of the electrical circuit of the flash array of FIG. 1, references 11 and 12 are again the connecting elements of the array already shown in FIG. 1. Only the circuit of the lamps 1 to 4 inclusive are shown. Connecting element 11 is inter alia provided with two conductors indicated by 20 and 21. The associated opening of the photo camera (not shown) is constructed in such a way that a high voltage pulse can be produced between these conductors, for example by means of a piezo element arranged in the camera, which piezo element is not shown in the drawing. Only a symbolic voltage source is shown. The flash lamp 1 is connected to the conductor 20. This lamp and also all other lamps are high voltage combustion flash lamps. FIG. 4 shows a longitudinal section of such a lamp. A capacitor 23 is also connected to the conductor 20 (see FIG. 2). The other electrode of this capacitor is connected to the other end of the lamp 1. This junction is connected to a radiationsensitive switch contact 24 which is constructed as a break-contact. The other end of this contact 24 is connected to the conductor 21. The combustion flash lamp 2 is also connected to the junction of the capacitor 23 and the lamp 1. In a similar manner a series circuit of a capacitor 25 and a melting strip 26 is also present between the conductors 20 and 21 and also a series circuit of a capacitor 27 and a melting strip 28. When a voltage pulse is applied for the first time between the conductors 20 and 21 lamp 1 is flashed. When lamp 1 flashes the melting contact 24, which originally constituted a conductive connection, is melted. This removes a shortcircuit from the circuit of lamp 2. If a voltage pulse is applied for the second time between the conductors 20 and 21 lamp 2 is flashed etc. The various connections are the same as disclosed in Applicants Dutch Patent Application 7507857 ( = PHN 8068). Furthermore, both a metal reflector 40, in which the lamps are arranged, as well as the indium oxide layer 13 on the cover 10 are connected to the conductor 21 shown in FIG. 2. The circuit, not shown in the drawing of the lamps 5 to 8 inclusive, is substantially the same as that of the lamps 1 to 4 inclusive which are shown in the drawing.

Figure 3:
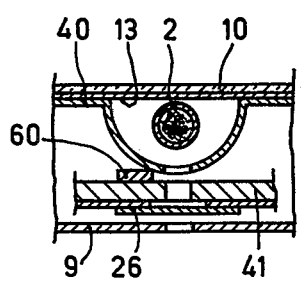
FIG. 3 shows a cross-sectional view through part of the flash array of FIG. 1.

FIG. 3 shows a cross-sectional view of part of the flash array of FIG. 1. Herein reference 10 again indicates the transparent cover, 13 the indium oxide layer. Reference 40 indicates part of the reflector, reference 41 designates a printed wiring board on which the circuit of FIG. 2 has been applied. The reflector 40 contacts a copper conductor 60 of the board 41. The conductor 60 is connected to ground, more specifically to the conductor 21 shown in FIG. 2. Reference 9 again indicates a part of the opaque casing of the flash array. As is shown diagrammatically in FIG. 2 the reflector 40 of, for example, the lamp 2 is connected to the conductor 21. This also applies - because the reflector foil of the flash unit consists of one piece - for all other lamps. As the indium oxide layer 13 intimately contacts the reflector 40 this reflector constitutes a link in the connection from the indium oxide layer 13 to conductor 60, and from there to the conductor 21 which is connected to terminals of the lamps. FIG. 2 shows that if not a single lamp has been flashed the terminals of the lamp 2 are short-circuited via the strips 24 and 26. Furthermore the reflector 40 and the indium oxide layer 13 have the same potential so that a shield in the way of a Faraday cage around the lamps has been obtained.

With this flash array of FIG. 1 - owing to the indicated measures- premature flashing of a lamp hardly occurs.

FIG. 4 shows a longitudinal section of a lamp of the flash array of FIG. 1. Lamp 1 is concerned here. The outside diameter of the lamp 1 is approximately 7mm. The spacing between the poles is approximately 0.8 mm. An ignition paste is at 1a. 1b represents shredded material. When a high voltage pulse of approximately three kVolts is applied via the circuit of FIG. 2 between the connecting wires of lamp 1 the paste 1a breaks down which causes the shredded material 1b, which, for example, consists of zirconium to react with the oxygen also present in the lamp 1. This produces a flash.

Figure 5:
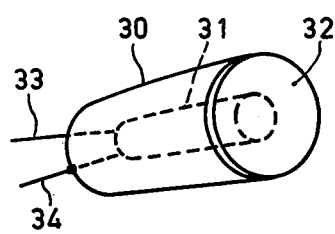
FIG. 5 shows a single lamp flash array according to the invention, provided with a reflector.

FIG. 5 shows a single lamp device according to the invention. It consists of a metal casing 30 whose inside is provided with a mirror. Reference 31 is a high voltage combustion flash lamp. Reference 32 is a transparent cover made of plastic provided at the inside with a layer of conductive indium oxide having a resistance per square of approximately 20 kOhm. This indium oxide layer is directly connected to the metal of the reflector 30. References 33 and 34 are connecting wires of the lamp 31. The connecting wire 34 is also connected to the reflector 30. Should a static charge be produced on the cover 32 due to rubbing then this will not result in a spontaneous flashing of the lamp 31 because of the fact that the indium oxide layer at the inside of this cover assumes a charge which acts as a compensation of the static charge on the cover 32.

Figure 6:
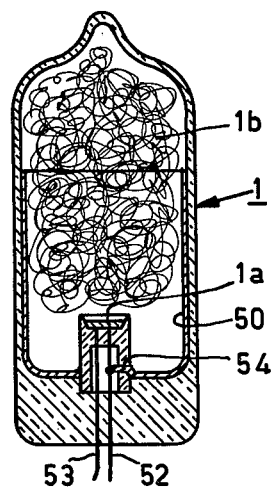
FIG. 6 shows a next flash array according to the invention, realised as flash lamp.

FIG. 6 shows next flash array according to the invention which flash array consists of one flash lamp only. In broad lines the lamp of FIG. 6 resembles that of FIG. 4. However, the lamp of FIG. 6 is provided with a transparent electrically conductive layer 50 which consists of conductive indium oxide. The cylindrical layer 50 is applied to the inside of the wall of the flash lamp. This layer is no longer present in the upper part of the lamp. The indium oxide layer 50 is connected via feedthrough 54 to a supply wire 52 of the lamp. Furthermore, the shredded material 1b which is electrically conductive contacts the electrically conductive layer 50. The layer 50 constitutes an electrical shielding of the paste 1a. Owing to the transparent character of this layer this shield does not result in an interception of the flash light of the lamp. Also the shredded material 1b co-operates in the electrical shielding as this material, via the transparent layer, has the same potential as the supply wire 52. Reference 53 indicates a second supply wire of the lamp. The shredded material 1b is, for example, zirconium.

Also with the lamp of FIG. 6 spontaneous flashing hardly occurs. Also in this case of FIG. 6 the indium oxide layer is approximately 4 nm thick, the resistance per square being approximately 20 kOhm.

What is claimed is:

1. A flash array which comprises: a housing, a plurality of combustion flash lamps carried by said housing, electrical terminals connected to said lamps, said housing including at least one wall which includes a translucent electrically conductive layers substantially all light radiating from the flash array passing through said transluscent electrically conductive layer and wall, said translucent electrically conductive layer being electrically connected to one of said terminals of the lamps, each of said plurality of lamps being a high voltage combustion flash lamp and the transparent electrically conductive layer having a resistance per square which is smaller than 50 kOhm and said transparent electrically conductive layer mainly consisting of conductive indium oxide.

2. A flash array as claimed in claim 1 further including means for short circuiting at least some of said lamps, and means to individually eliminate said means for short-circuiting before ignition.

3. A flash array as claimed in claim 1 in which said transparent electrically conductive layer is applied to the inside of said one wall of said housing.

* * * * *

UNITED STATES PATENT AND TRADEMARK OFFICE
CERTIFICATE OF CORRECTION

PATENT NO. : 4101260
DATED : July 19, 1978
INVENTOR(S) : MARKUS WILHELM MATTHIJS ET AL It is certified that error appears in the above-identified patent and that said Letters Patent are hereby corrected as shown below:

Claim 1, line 41, "layers" should be --layer--

Signed and Sealed this

Twelfth Day of June 1979

[SEAL]

Attest:

RUTH C. MASON
Attesting Officer

DONALD W. BANNER
Commissioner of Patents and Trademarks